Oct. 3, 1950 W. ORJALA 2,524,633
FOUR-WHEEL TRAILER CONVERTIBLE TO TWO-WHEEL TRAILER
Filed Dec. 26, 1945 3 Sheets-Sheet 3
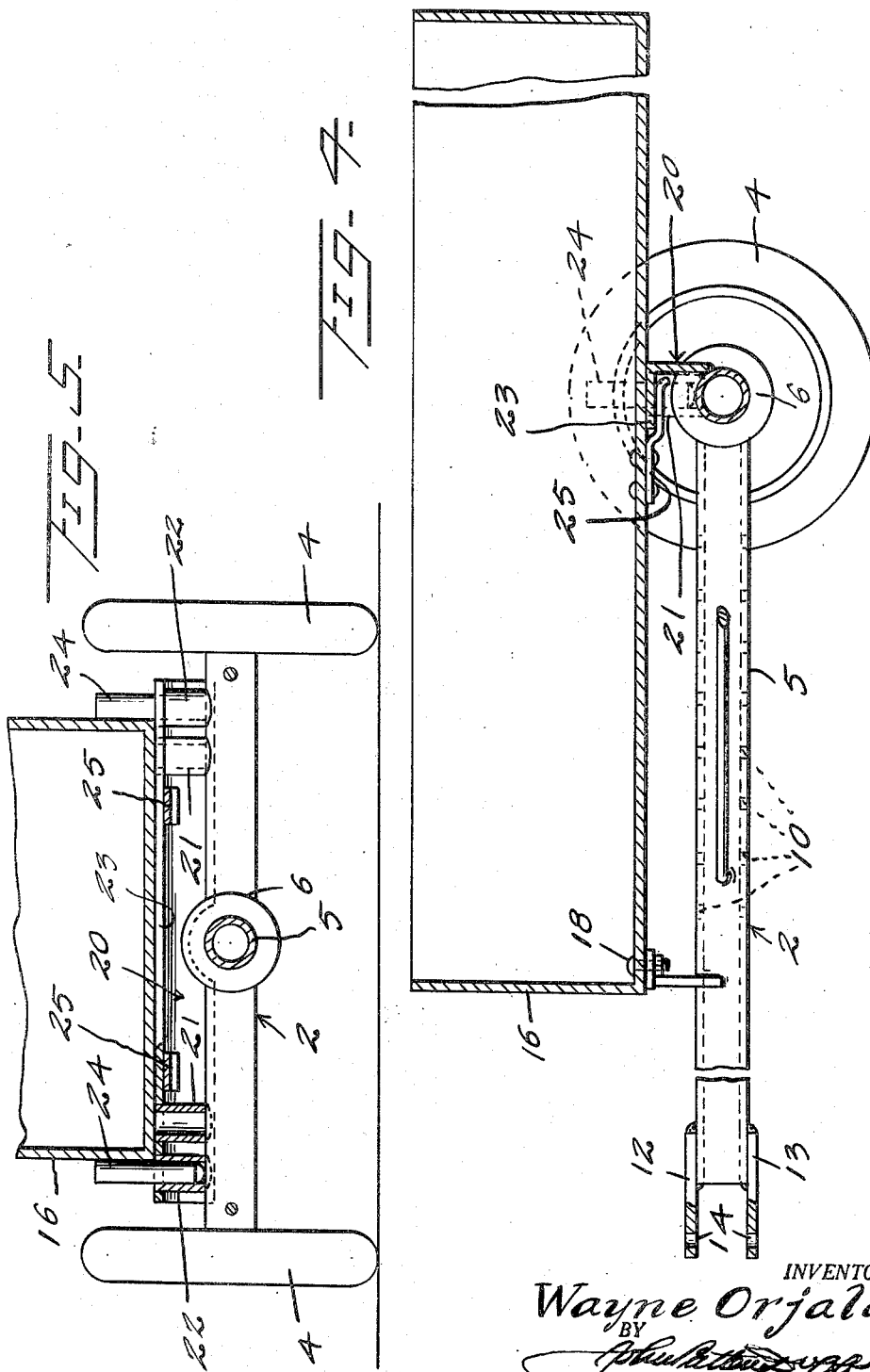
INVENTOR.
Wayne Orjala

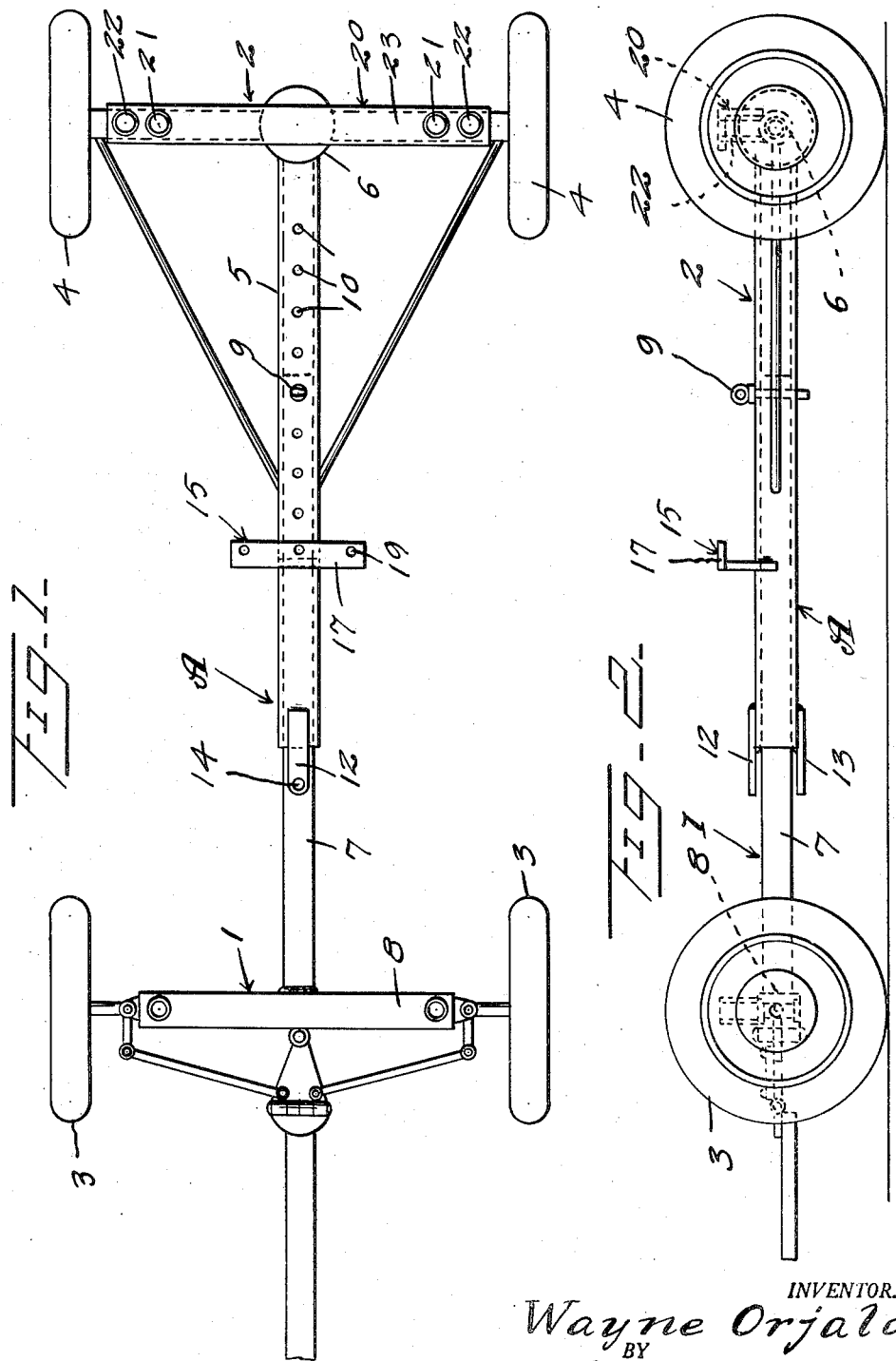

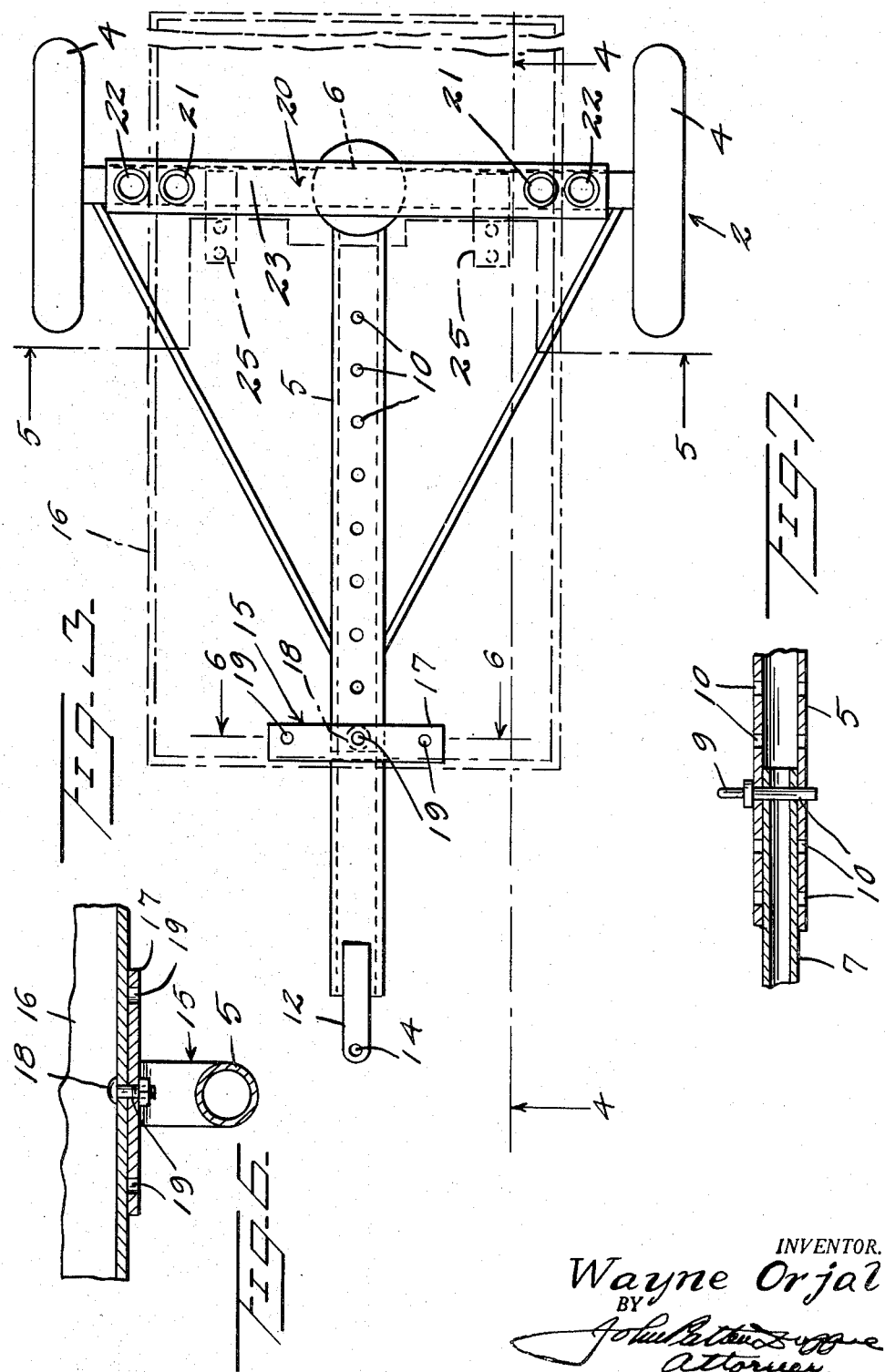

UNITED STATES PATENT OFFICE 2,524,633

FOUR-WHEEL TRAILER CONVERTIBLE TO TWO-WHEEL TRAILER

Wayne Orjala, East Lake, Minn.

Application December 26, 1945, Serial No. 637,206

1 Claim. (Cl. 296—35)

This invention relates to new and useful improvements in four wheel trailers.

The primary object of my invention is to provide novel means whereby the rear half or section of the trailer may be used as a two wheel trailer, if, as and when desired.

A further object of my invention is to provide novel means for supporting a suitable box or receptacle on the rear section, and whereby a box wider than the width of the four wheel trailer body, may be employed.

With the foregoing and other objects in view that will appear as the nature of my invention is better understood, the same consists in the novel features of construction, combination and arrangement of parts illustrated in the accompanying drawing and more particularly pointed out in the appended claim.

In the accompanying drawings, which are for illustrative purposes only and are therefore not drawn to scale:

Figure 1 is a plan view of a four wheel trailer, constructed in accordance with my invention.

Figure 2 is a side elevation.

Figure 3 is an enlarged plan view of the rear section of the trailer, with the box indicated in dotted lines.

Figure 4 is a vertical longitudinal section, taken on line 4—4 of Figure 3.

Figure 5 is a vertical transverse section, taken on line 5—5 of Figure 3.

Figure 6 is an enlarged detail transverse section, taken on line 6—6 of Figure 3, and Figure 7 is a detail longitudinal section, taken through the apertured telescopic pipes of the front and rear sections.

Referring to the drawings for a more particular description of my invention, and in which drawings like parts are designated by like reference characters throughout the several views, A generally designates a four wheel trailer, consisting of the front and rear telescopic sections 1 and 2, respectively, and the front and rear wheels 3 and 4. As shown, a tubular pipe 5 is welded solidly at its rear end to the rear axle housing 6 and receives the rear end of a tubular pipe 7 of slightly smaller diameter, welded at its front end to the front axle 8. The wheel base of the trailer may be adjusted to meet the requirements by inserting the pin 9 through one of the transverse apertures 10, as will be apparent. These parts are of the usual or ordinary construction and no further explanation in this connection is deemed necessary.

In carrying out my invention, the front end of the tubular pipe 5, is provided with a pair of corresponding upper and lower flat bars 12 and 13, formed at their forward free ends with the vertical registering apertures 14. The bars 12 and 13 aforesaid form the hitch when the rear half or section of the vehicle is detached and used as a two wheel trailer and the apertures 14 are adapted to receive a coupling pin (not shown).

An upright T-shaped bracket 15 is welded or otherwise secured to the front end of the hollow pipe 5, somewhat in rear of the hitch, and forms a rest or support for the box 16, which is used with the two wheel trailer. The front end of said box rests directly on the horizontal transverse arm 17 of the bracket 15 and is held in place by a bolt 18, which extends through a corresponding opening 19 in said arm. The angle iron strip 20, which is welded solid to the rear axle housing 6 and serves as a cross bunk, is provided at each end with a pair of corresponding laterally spaced inner and outer tubular pipe sections 21 and 22, respectively, which are arranged with their upper ends flush with the upper face of the horizontal member 23 of said angle iron strip 20. Stakes 24 in the form of longer tubular pipe sections, are inserted in and used in connection with the inner pipe sections 21 when the vehicle is used as a four wheel trailer and inserted in the outer pipe sections 22 when the vehicle is used as a two wheel trailer. This allows a wider box to be used when the vehicle is used as a two wheel trailer, since clearance to allow the front wheels to turn does not have to be provided.

Two flat irons or clips 25 are fastened to the rear end and bottom of the box 16 and are adapted to slip under the horizontal member 23 of the angle iron cross bunk 20 and prevent said box from jumping up.

From the foregoing description taken in connection with the drawings, it is thought that the construction, operation and advantages of my invention will be readily understood, without requiring a more extended explanation.

Having described my invention, what I claim as new and desire to secure by Letters Patent, is:

In a four wheel trailer, the combination with the chassis, of a box adapted to be used in connection with the rear section of the chassis as a two wheel trailer, an upright T-shaped bracket secured to the front end of the rear section and adapted to form a rest or support for the front end of said box, means for fastening the front end of the box to the horizontal member of the T-shaped bracket, an angle iron cross bunk mounted on the rear axle housing, a pair of corresponding laterally spaced inner and outer pipe sections welded to each end of said angle iron cross bunk with their upper ends flush with the horizontal top member of the latter, and longer pipe sections adapted to be inserted in the inner pipe sections and forming stakes for the box when the vehicle is used as a four wheel trailer and adapted to be inserted in the outer pipe sections and forming stakes for the box when the vehicle is used as a two wheel trailer.

WAYNE ORJALA.

REFERENCES CITED

The following references are of record in the file of this patent:

UNITED STATES PATENTS

| Number | Name | Date |
|---|---|---|
| 754,318 | Keffer | Mar. 8, 1904 |
| 899,790 | Hamilton | Sept. 29, 1908 |
| 1,089,767 | Johnston | Mar. 10, 1914 |
| 1,162,564 | Buescher | Nov. 30, 1915 |
| 1,222,868 | Holland | Apr. 17, 1917 |
| 1,277,361 | Bauman | Sept. 3, 1918 |
| 1,425,596 | Kramer | Aug. 15, 1922 |
| 1,470,324 | Hunter | Oct. 9, 1923 |
| 1,799,233 | Holan | Apr. 7, 1931 |
| 2,374,383 | Sampsell | Apr. 24, 1945 |

FOREIGN PATENTS

| Number | Country | Date |
|---|---|---|
| 48,118 | Sweden | Sept. 26, 1917 |